No. 617,198. Patented Jan. 3, 1899.
M. R. SPELMAN.
SUGAR CANE WAGON.
(Application filed Feb. 28, 1898.)
(No Model.) 2 Sheets—Sheet 2.
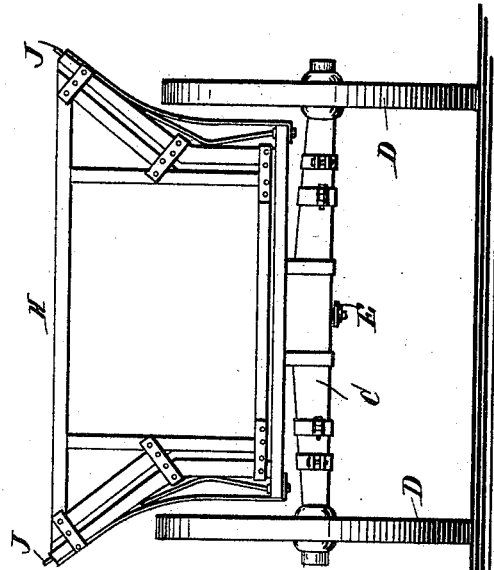
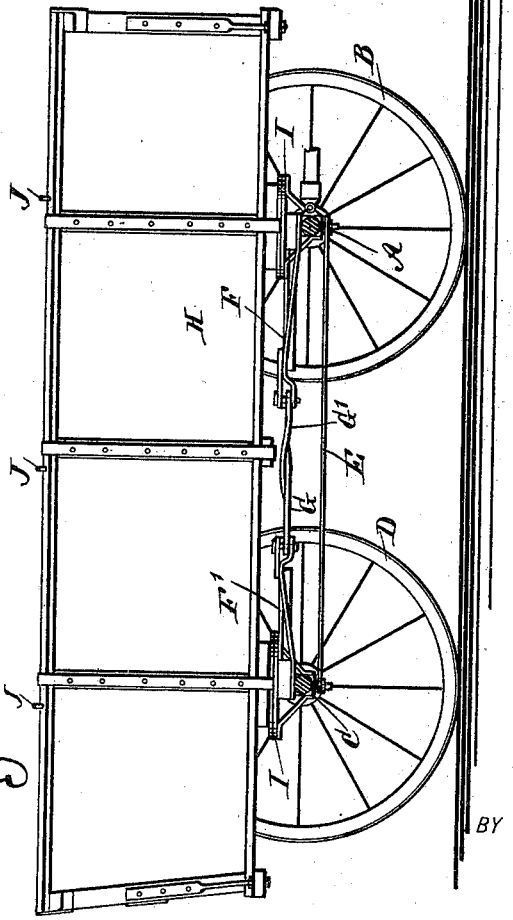
WITNESSES:
INVENTOR
M. R. Spelman,
BY
ATTORNEYS.
THE NORRIS PETERS CO., PHOTO-LITHO., WASHINGTON, D. C.

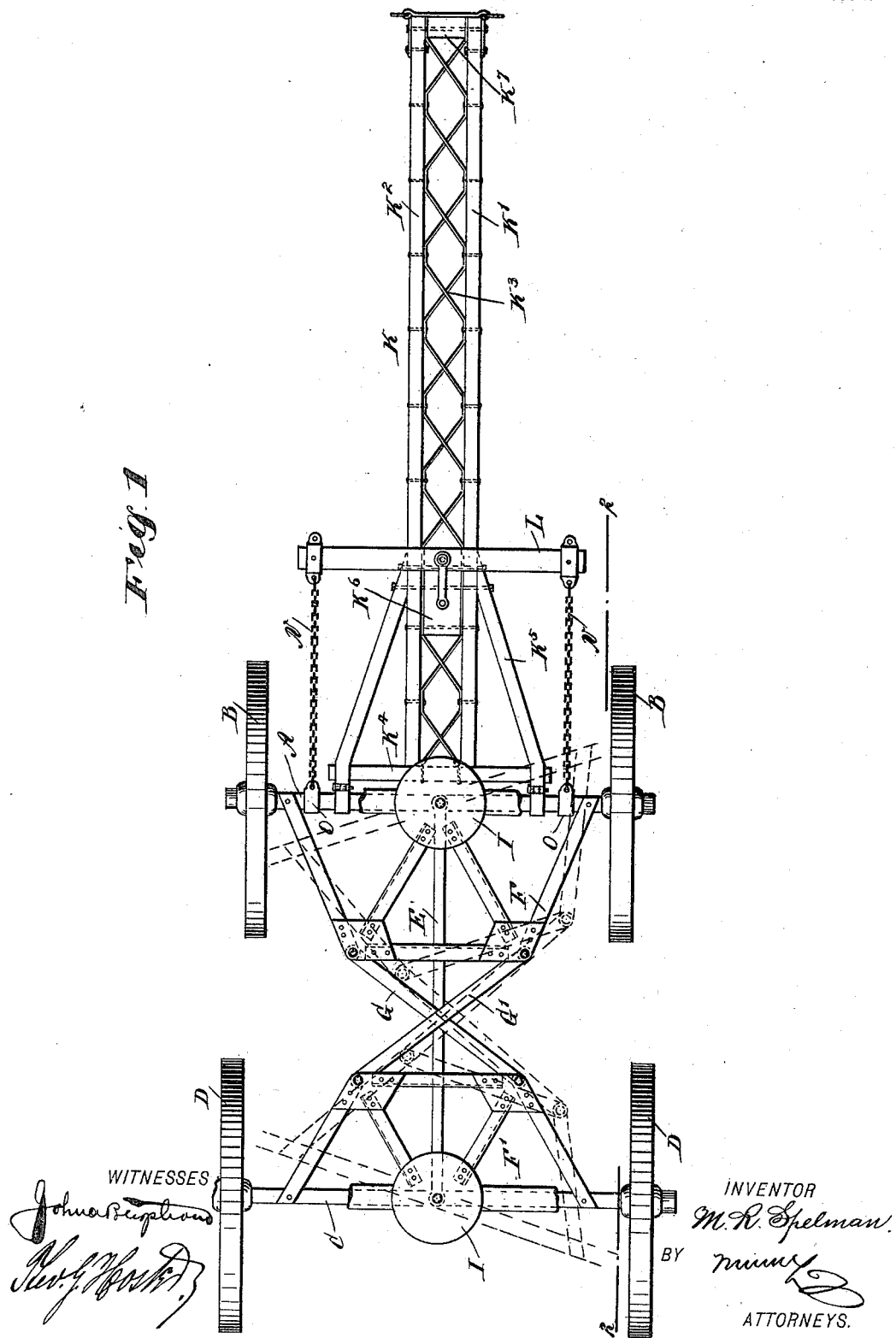

UNITED STATES PATENT OFFICE.

MARK R. SPELMAN, OF NEW ORLEANS, LOUISIANA.

SUGAR-CANE WAGON.

SPECIFICATION forming part of Letters Patent No. 617,198, dated January 3, 1899.

Application filed February 28, 1898. Serial No. 671,961. (No model.)

*To all whom it may concern:*

Be it known that I, MARK R. SPELMAN, of New Orleans, in the parish of Orleans and State of Louisiana, have invented a new and Improved Sugar-Cane Wagon, of which the following is a full, clear, and exact description.

The object of the invention is to provide a new and improved sugar-cane wagon or cart arranged to permit of readily turning around in a comparatively small space and to allow of conveniently loading the sugar-cane into a sling held in the wagon or cart body.

The invention consists of novel features and parts and combinations of the same, as will be described hereinafter and then pointed out in the claims.

Reference is to be had to the accompanying drawings, forming a part of this specification, in which similar characters of reference indicate corresponding parts in all the figures.

Figure 1 is a plan view of the running-gear of the wagon, the body being removed. Fig. 2 is a sectional side elevation of the improvement on the line 2 2 of Fig. 1, and Fig. 3 is an end elevation of the same.

The sugar-cane wagon is provided with a front axle A, carrying the front wheels B, and a rear axle C, carrying the rear wheels D, the latter being of a gage somewhat wider than that of the front wheels B, and preferably the inner faces of the wheels D are in alinement with the outer faces of the front wheels B, as will be readily understood by reference to Fig. 1. The axles A and C are pivotally connected with each other at their middle by a reach E, and the said axles are provided with frames F F', extending toward each other from adjacent sides, the frames being pivotally connected with each other by diagonal reaches G G', crossing each other in the manner indicated in Fig. 1, so that when the wagon is drawn forward and the front axle A is turned to one side, as indicated in dotted lines in Fig. 1, then the said diagonal reaches G G' will turn the rear frame F' and the axle C into a converging angular position relative to that of the axle A, as indicated in dotted lines in Fig. 1. Thus when the wagon is pulled around a corner the rear wheels D are free to turn within a comparatively short space, so that the wagon can be readily turned around at the end of a road in the cane-field without describing a large curve.

The wagon-body H is connected by fifth-wheels I with the front and rear axles A and C to permit the running-gear of the wagon to readily operate as above described when the wagon passes around a corner or is turned around. The wagon-body H has the lower portions of its sides vertical, the upper portions of the sides being inclined outwardly, as plainly indicated in Fig. 3. The top of each side is provided with pins J for receiving the links of the sling-chains placed in a transverse position in the wagon-body, so that when the cane is loaded in the wagon-body it can be readily bundled by disconnecting the ends of the sling-chains from the pins J and closing the ends over the cane in the wagon to remove the cane in a bundle therefrom by a suitable hoisting device. By having the pins J the chains are not liable to slip back into the wagon-body when the cane is loaded into the wagon, thus enabling the operator to readily close or bundle the cane by the sling-chains when it is desired to remove the cane in a bundle from the wagon-body.

The wagon-pole K is preferably in truss form, as indicated in Fig. 1, and is for this purpose provided with two side bars K' K², connected with each other by braces K³, crossing each other, as indicated in the said figure. The inner ends of the side bars K' K² are connected with a cross-bar K⁴, pivotally connected with the front axle A and also connected by braces K⁵ with the side bars K' K². Blocks K⁶ K⁷ connect the side bars with each other near the inner end and at the outer end, and on the block K⁶ is fulcrumed a doubletree L, carrying the usual singletrees to which the team is hitched. Chains N extend from the outer ends of the doubletree L to suitable clips O on the axle A to equalize the pull on the doubletree.

The wagon-body H is strengthened by suitable braces, as indicated in Figs. 2 and 3, but such construction is not essential. The pins J on the upper edge of the sides of the body H can also be made use of on other sugar-cane-transporting vehicles, such as cars and the like.

Having thus fully described my invention,

I claim as new and desire to secure by Letters Patent—

1. A wheeled vehicle comprising a body, a front axle, a rear axle, fifth-wheels connecting the vehicle-body with the front and rear axles, a reach pivotally connecting the axles with each other at their middle, frames connected at their outer ends with the respective axles and extending inward toward each other, the sides of the said frames converging at their inner ends, and diagonal braces crossing each other and pivotally connected with the inner converging ends of the said frames substantially as shown and described.

2. A wheeled vehicle provided with a running-gear comprising a front axle carrying wheels, a rear axle carrying wheels of a gage wider than that of the wheels of the front axle, a reach pivotally connecting the axles with each other at their middle, frames connected with the inner sides of the axles and extending toward each other, the said frames being located above the reach connecting the axles, the sides of the said frames converging at their inner ends, and diagonal reaches crossing each other and pivotally connected with the inner converging ends of the said frames, substantially as shown and described.

3. A wheeled vehicle provided with a body having the upper portions of its sides inclined outwardly, and a series of outwardly-inclined pins on the upper edge of each of said sides, for receiving the links of sling-chains extending transversely in said body, substantially as shown and described.

4. A sugar-cane wagon provided with a pole consisting of two parallel side bars connected with each other by braces, a cross-bar connected with the inner ends of the side bars and pivotally connected with the front axle, braces connecting the ends of said cross-bar with the side bars, a block connecting the side bars with each other at the outer end, and a block connecting the side bars with each other near the inner end and on which is fulcrumed a doubletree, substantially as shown and described.

MARK R. SPELMAN.

Witnesses:
   THEO. G. HOSTER,
   EVERARD BOLTON MARSHALL.